May 24, 1938.   E. O. SCHWEITZER   2,118,116
ELECTRIC COOKING SYSTEM
Filed March 15, 1935   2 Sheets—Sheet 1
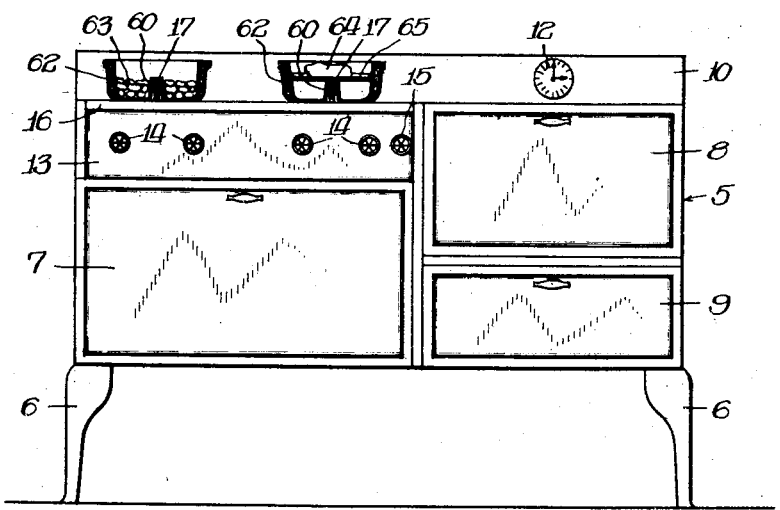
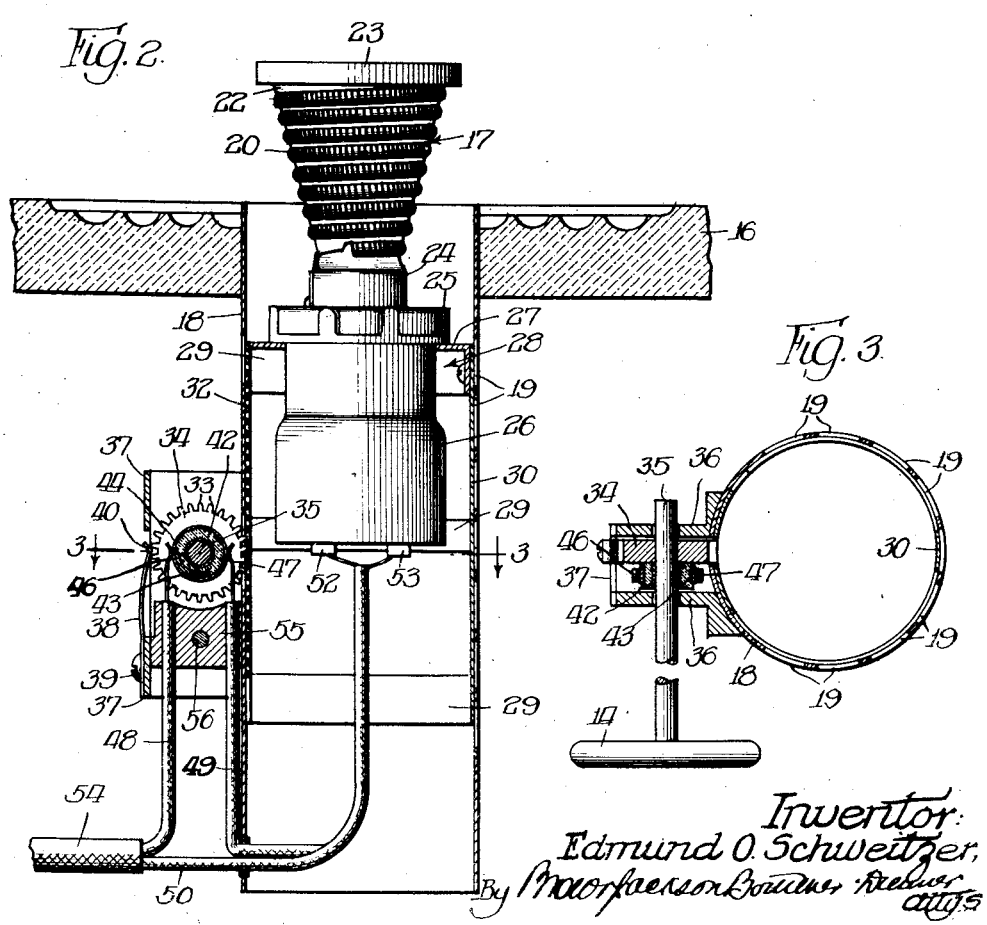
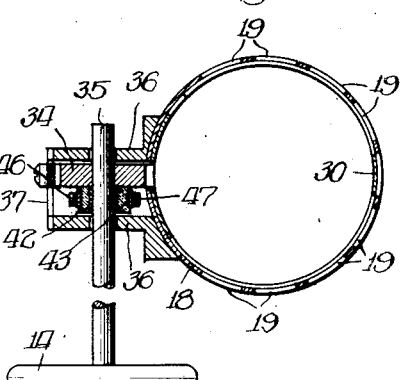
Inventor:
Edmund O. Schweitzer May 24, 1938.  E. O. SCHWEITZER  2,118,116
ELECTRIC COOKING SYSTEM
Filed March 15, 1935   2 Sheets-Sheet 2
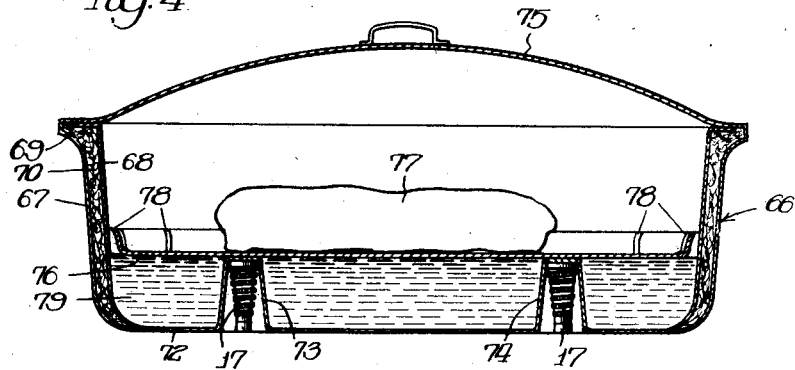
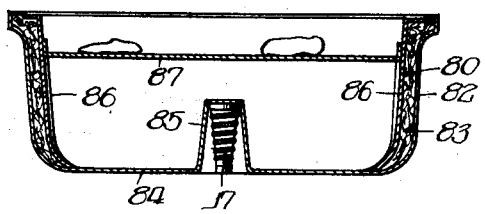
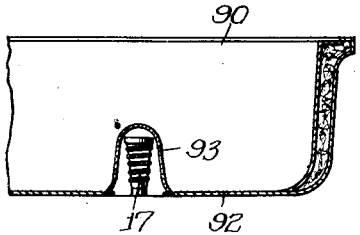
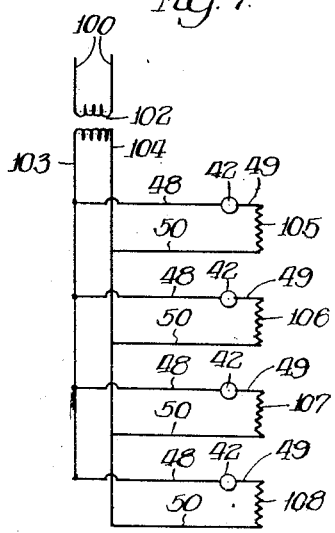
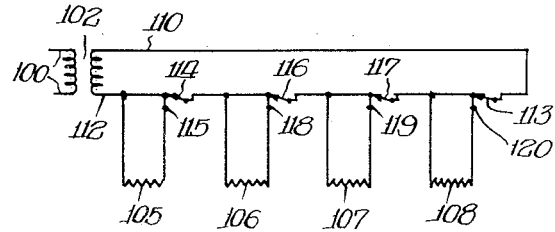
Inventor:
Edmund O. Schweitzer, Patented May 24, 1938

2,118,116

UNITED STATES PATENT OFFICE 2,118,116

ELECTRIC COOKING SYSTEM

Edmund O. Schweitzer, Northbrook, Ill.

Application March 15, 1935, Serial No. 11,230

12 Claims. (Cl. 219—37)

This invention relates to electric cooking systems, and more particularly is directed to electrically operated ranges for domestic and industrial uses.

Electrical ranges of the type now in use rely, in the main, on the provision of surface heating units, formed in the shape of flat spirals or the like, and either enclosed within metallic tubing, or set into grooves in a porcelain or similar refractory brick. Such ranges are operated almost entirely by conduction of the heat generated by the resistance unit through the lower surface or bottom of the pots, pans or other culinary utensils in which food is to be cooked. This heat conduction is in an upward direction through the bottom of the utensil and also radially outwardly toward the lateral surface of the utensil. As a result, heating of the material to be cooked is effected by conduction of externally applied heat into the utensil through the lateral and bottom walls thereof and toward the center of the utensil.

This results in a loss of efficiency, due to the fact that before heat is actually applied to the material to be cooked, it is necessary to heat up the relatively large external surface of the unit. These utensils, as recently developed, have been provided with polished external surfaces still further reducing the transmission of heat into the interior of the utensil. Also, if the utensils are of the double-walled type having an annular ring of insulating material or the like therein, it is apparent that the insulating barrier must first be heated up before transmission of heat therethrough into the interior of the utensil can be obtained.

The present invention is directed to a cooking system wherein the heat is applied substantially centrally within the utensil, and by conduction and radiation is transmitted through the material to be cooked toward the outer surfaces of the utensil. Thus the heat is immediately applied to the material to be cooked and no heat loss from the utensil is entailed until after the heat has passed entirely through the material within the utensil.

In a preferred embodiment of the invention, I provide a cooking system wherein the utensils are formed with a hollow internal core or dome, which is centered above a vertically adjustable electric heating member of the space heating type, that is, a helical or cylindrical electrical resistance unit carried upon an axially extending heat refractory core, the core being adjustable vertically within the hollow recess of the utensil. Thus the heat generating means is positioned substantially centrally within the utensil, with the material to be cooked surrounding it, and the transmission of heat is hence directly through the internal dome into the food or other material to be heated or cooked.

By the use of a double-walled insulated pot or utensil, the efficiency of such a cooking system can be measurably increased, due to the fact that the insulation is in the proper position for preventing escape of heat from the utensil, and hence confines the heat therein. However, even without such insulated construction, the rate of cooking is substantially increased over that produced by the surface units heretofore employed beneath the bottom of the utensil, since the application of the heat allows its immediate use for cooking instead of preheating purposes.

One object of the present invention is the provision of a cooking system wherein heating of the foodstuffs within a cooking utensil is effected by transmission of heat from the center of the utensil outwardly toward the lateral walls thereof through the material to be cooked.

Another object of the present invention is the provision of a heating unit for cooking material within a pot or the like, which unit is adjustable as to its position with respect to the center of the pot.

A still further object of the invention is the coordination of cooking utensil construction with an electric heating unit of the helical cone type, in such manner as to effect most efficient transmission of heat to the material which is to be cooked within the utensil.

Another feature of the present invention is the modification of electric cooking systems so as to effect direct transmission of heat to the material to be cooked by both radiation and conduction.

An important advantage secured by my invention is the provision of a structure which results in appreciable reduction in the time elapsing between energization of the heating means and application of the heat produced thereby to the material to be cooked.

Another advantage secured by the present invention is the fact that no heat loss through the side walls of the cooking utensil occurs until after the heat has been transmitted entirely through the material being cooked within the pot or pan.

Other objects and advantages of the present invention will appear more fully from the following detailed description, which, taken in conjunction with the accompanying drawings, will disclose to those skilled in the art the particular construction and operation of a preferred form of my invention.

In the drawings:

Figure 1 is a front elevational view of one form of a domestic range embodying the present invention;

Figure 2 is a vertical sectional view through one of the heating units of the present invention;

Figure 3 is a sectional view taken substantially on line 3—3 of Figure 2, showing the manner in which energization of the unit and adjustment of its position are obtained;

Figures 4, 5, and 6 are sectional views through modified forms of cooking utensils to be used with the present type of cooking system;

Figure 7 is a diagrammatic circuit showing one manner of effecting electrical connection to the heating units of the present invention; and Figure 8 is a diagrammatic circuit illustrating another manner of effecting electrical connection to the heating unit of the present invention.

Referring now in detail to the drawings, I have shown in Figure 1 a range 5, supported on a floor or other surface by suitable legs 6, having a storage compartment 7, oven compartment 8, and a broiler compartment 9.

The range of Figure 1 is of the console type, having a flat top surface, extending across the entire width thereof, and provided with a back panel 10. A suitable electric clock or similar timing member may be mounted in the back panel, as shown at 12.

A control panel for the range is shown at 13, having control members 14 for controlling each of the top heating units or range heating members, and a control member 15 for controlling the heating unit within the oven 8. The top slab covering the oven part of the range is indicated generally at 16, and, as shown in Figure 2, preferably comprises a porcelain or similar refractory slab member, having openings through which a plurality of individual heating units 17 are adapted to project. Preferably, four of such units are employed in the range shown in Figure 1.

Considering now Figures 2 and 3 in more detail, the slab 16 is provided at spaced points with openings adapted to receive suitable cylindrical sleeve members 18, which sleeve members are provided with a plurality of perforations 19 providing for flow of air into the interior thereof. The sleeve 18 extends downwardly for a considerable distance below the lower surface of the slab 16, and provides, in effect, a flue or chimney for the heating unit 17.

This heating unit comprises an electrical resistance wire 20, wound in a suitable spiral groove formed in a suitable heat insulating cone 22, which may be formed of porcelain or other similar refractory material. A suitable cap member, formed of the same material, is indicated at 23. The lower portion of the cone 22 of the unit 17 terminates in a supporting portion 24, carried within an annular flanged portion 25 formed at the upper end of the socket member 26, which socket member is carried within an opening formed in a flanged collar member 27, the flange portion 25 of the socket 26 having bearing engagement about the defining periphery of the opening in the collar 27 within which the socket 26 is suspended. The core 22 may be suitably secured within the flange 25 by bent over tab fingers or the like, as shown.

The collar 27 is mounted in a suitable carrier member 28, comprising a plurality of cylindrical bands 29 joined together by means of spaced vertically extending strips 30, the carrier 28 being open between the strips 30 and bands 29 to provide for free flow of air through the perforations 19 into the interior of the carrier. At one defining vertical surface of the carrier 28 there is provided a suitably perforated member 32 forming a rack, the member 32 having a plurality of laterally extending slots therein adapted to be engaged by the projecting teeth 33 of a pinion member 34. The member 34 is suitably keyed or otherwise secured for rotation on a shaft 35 extending forwardly through the control panel 13 of the range, and provided with an operating handle 14.

The shaft 35 is suitably supported for rotation by a pair of bracket members 36 secured to the sleeve 18 in any suitable manner, as by welding, soldering or by screws or rivets. The brackets 36 are joined, at their extending ends, by cross members 37 forming a suitable enclosure for the pinion 34. A leaf spring member 38 is mounted upon the external surface of one of the cross members 37 by means of a screw 39, and is provided with a suitable engaging portion 40 adapted to have resilient engagement between adjacent teeth 33 of the pinion 34 for holding the pinion 34 in any desired adjusted position.

Mounted within the extending portion of the bracket 36 upon the shaft 35 is an insulating collar member 42, which member is provided about the major portion of its periphery with a metal contact ring 43, the ends of the arcuate ring 43 being spaced apart by an insulating block member 44 set into the collar 42. The collar 42 is adapted to have rotary movement upon rotation of the shaft 35, and thereby effects rotation of the contact ring 43 upon rotation of the pinion 34, and consequently in accordance with raising or lowering of the carrier member 28 carrying the heating unit 17.

A pair of contact members 46 and 47, respectively, are adapted to have contact bearing engagement about the external surface of the ring 43, and when the device is in position such that the heating unit 17 is in its lowermost position, the insulating block 44 will be in engagement with one of the contacts, such as contact 46, while the other contact 47 will be in engagement with the metallic ring 43. Upon rotation of handle or control member 14, the shaft 35 will effect rotation of pinion 34, thereby raising the carrier 28 and heating unit 17 above the surface of slab 16. At the same time, by the rotation of member 42 the block 44 will be rotated out of engagement with the contact 46, and consequently contact will be effected between the contacts 46 and 47 through ring 43.

This completes a circuit between conductors 48 and 49, and thereby completes a circuit to the heating unit through conductors 48, 49, and 50, the conductors 48 and 49 forming portions of one conductor leading to the terminal 52 of the socket member 26, while the conductor 50 leads to a terminal 53 of the socket member 46. These conductors are led to the heating unit from a source of current supply through an insulating cable, such as cable 54, and the particular circuit connections will be described in detail later.

The contacts 46 and 47 are supported in position for engagement with the contact ring by means of an insulating block member 55, secured between the extending portion of the bracket 36 in any suitable manner, as by the bolt 56. The members 46 and 47 are resilient spring members, having wiping engagement along the contact surface, and being normally urged into pressure contact therewith.

It is apparent, therefore, that upon initial rotation of shaft 35 to raise the unit 17 from its lowered position, in which position the cap member 23 lies flush with the upper surface of the slab member 16, contact will be effected between the contacts 46 and 47, closing the circuit to the heating unit 17, and consequently causing energization of the heating coil 20 for heating purposes.

As shown somewhat diagrammatically in Figure 1, the heating units 17 are adapted to extend into suitable domes or recesses 60 formed in pot members 62, or other types of cooking utensils. The members 62 are adapted to contain material to be cooked, such as indicated at 63 and 64, the material 64 being carried upon an auxiliary supporting tray 65 seating within the interior of the pot 62 on the upper surface of the dome or recess 60. When the units are raised to their upward limiting position, they are fully enclosed within the recesses 60, and consequently the heat generated thereby will be transmitted laterally outwardly and upwardly from the unit, thus effecting complete and rapid heating of the food materials 63 and 64.

Referring now in more detail to the construction of the various cooking utensils which may be employed in the present electric cooking system, in Figures 4, 5, and 6 I have disclosed several forms of such utensils. However, it is to be understood that the invention is not limited to these specific forms of utensil, but may be employed for any of the desired types of cooking utensils which are now commonly employed for culinary purposes.

In Figure 4 I have illustrated a roaster, which may also be employed as a boiler or basting oven. The roaster is indicated generally at 66, and comprises a double walled utensil having the walls 67 and 68, which are suitably spun and joined, as at 69, the space between the walls 67 and 68 being filled with suitable insulating material 70. This insulating material may comprise mineral wool, or any other type of fibrous or mineral heat insulating material. The bottom wall of the utensil is formed as a sheet member, indicated at 72, and provided with integral spaced recessed portions 73 and 74. The recesses 73 and 74, in a roaster of this type, which is usually elliptical in shape, are preferably centered with respect to the respective focii of the ellipse, so that distribution of heat will be substantially uniform throughout the roaster.

The roaster is provided with an upwardly concaved cover member 75, which has seating engagement in the shallow ring formed by the joining of the walls 67 and 68 at the junction 89. The domes 73 and 74 may be of frusto-conical shape, and are joined to the bottom wall 72 of the roaster by smoothly curved fillets or joining surfaces, thereby providing no sharp corners in which food particles or the like may be deposited, and facilitating cleaning of the utensil. The upper ends of the recesses 73 and 74 are closed, either by integral portions of the defining walls of the recesses, or by separate closure plates joined thereto by smoothly curved portions. If desired, the upper surfaces of the domes 73 and 74 may be employed as supporting surfaces for supporting a shallow tray 76 within the roaster, which tray may contain meat or similar food to be cooked, indicated at 77, the tray being provided with spaced fluted edge portions 78 providing for passage of steam from the water 79 within the bottom of the tray upwardly past the tray and over the surface of the material to be cooked, thereby basting the same.

It will be apparent that the heat generated by the unit 17 will be conducted through the walls of the recesses 73 and 74 into the water 79 surrounding the same, and will thereby be transmitted radially outwardly toward the side walls of the container. However, the water will be thoroughly heated before any heat is lost through the side walls 67 and 68 of the roaster, and consequently the heat will be applied to the bottom of the tray 76 before any appreciable heat loss is sustained through the lateral side walls of the roaster. This provides for the efficient transmission of a heat to the material to be cooked, since no heat loss is occasioned prior to the application of heat directly to the material to be cooked.

In Figure 5 I have provided a modified form of pot or pan, which may be a pan of the ordinary sauce pan type, or any desired type of pan, preferably shown with double walls 80 and 82 between which suitable insulation 83 is disposed. The lower or bottom surface 84 of the pan is provided with an integrally formed downwardly opening dome 85, within which is adapted to be projected the heating unit 17, the bottom 84 of the pan being adapted to rest upon the upper surface of the slab member 16. The inner wall 80 of the pan is provided with upwardly extending spaced ribs 86, which ribs provide a suitable support for a shallow pan 87 upon which may be supported any suitable material to be fried, roasted or otherwise cooked. If this pan 87 is not to be employed, the same may be removed, and the pot can then be employed for cooking vegetables, such as potatoes, or similar vegetables cooked in water, or for cooking or canning fruit or the like.

In Figure 6 I have shown a modified type of pan indicated at 90, which is provided with the bottom wall 92, in which is set a suitably inverted cup-shaped glass dome 93, formed of heat resistant glass, such as "Pyrex" or the like, and which is adapted to form a recess to receive the heating unit 17. By the use of such a glass dome, both radiant and conducted heat are transmitted to the material within the pan 90, and consequently the material may be cooked by radiant heat, thereby securing all the benefits of such heating. The peripheral edge of the dome 93 may be suitably cemented or otherwise secured in an annular groove or the like formed in the bottom wall 92 of the pot 90.

It is to be understood that each of the pots disclosed may be of the single wall type, if desired, without in any way departing from the scope of the present invention. While I have found that double walled utensils are desirable, inasmuch as they prevent lateral heat loss from the interior of the utensil, and thereby confine heat within the utensil, it is understood that single walled utensils of the type now commonly in use may also be employed.

It will be noted that by the provision of pots or utensils having the upwardly extending internal domes or recesses into which the heating unit 17 may be projected, the heat from the unit 17 will not be carried away by drafts, air currents or the like, but will be directly communicated through the domes into the interior of the pot, substantially at the central or focal points thereof, and will be dissipated radially through the material to be cooked until finally the material has been heated to such a temperature that the heat transmitted thereto passes to the side walls of the utensil.

However, if the side walls are insulated, this heat will not be readily dissipated through the insulation, and consequently the efficiency of the application of heat can be measurably increased by providing insulating walls for the utensils. However, it is apparent that such walls need not be provided in order to carry out the underlying principles of the present invention, and that even without such walls the efficiency of the electrical application of heat by means of supplying this heat substantially centrally of the utensil is measurably increased over the surface type heating unit now in common use.

While I have disclosed only a very few of the large number of different types of cooking utensils which are employed for culinary purposes, it is to be understood that any desired type or shape of utensil we may employ may be provided with a suitable recess in the bottom thereof for receiving the heating means. The invention is therefore applicable to double-broilers, coffee pots, Dutch ovens, and pots and pans of all descriptions.

In Figure 7 I have disclosed one form of electrical circuit for the range of Figure 1, when it is desired to connect the heating unit in parallel. A suitable source of current supply is indicated at 100, and is transmitted, through transformer 102, to the conductors 103 and 104 which extend into the range. The heating units 105, 106, 107, and 108, which comprise the upper or range heaters for the range 5, and which are controlled by the control members 14, are connected across the conductors 103 and 104 in parallel. Each of the units 105, 106, 107, and 108 is provided with a suitable switching means connected to its control member 14, such as the collar 42 described in detail in connection with Figures 2 and 3, for effecting connection between conductors 48 and 49 to complete a circuit through these conductors and the heating units and the return conductors 50.

If it is desired to connect the units in series, such a connection is shown in Figure 8, in which the secondary side of the transformer 102 is provided with conductors 110 and 112, the conductor 110 being a return conductor connected to the end one of the heating units through the switch 113. In this circuit, when it is desired to energize the heating unit 105, for example, the switch 114 is operated, shifting the circuit from the conductor 112 to the contact 115, thereby completing a circuit through the resistance unit 105. In a similar manner, switches 116 and 117 are provided for the units 106 and 107, and switch 113 is provided with a unit 108. The switches 116 and 113 are adapted to complete a circuit either through conductor 112, or through the units 106, 107 and 108, respectively, by engagement with contacts 118, 119 and 120, respectively.

These switches may be provided adjacent the respective control members 14 for each of the units 105, 106, 107, and 108, the control units themselves being also provided with switches, such as the collars 42, for effecting the complete connection to the resistance unit, or the switches 114, 116, 117, and 113 may comprise suitable switching means mounted on the control member as shown in Figure 2, but provided with a third contact whereby contact is switched from one of the conductors, such as conductor 112, to the conductor 115 leading to the resistance unit for completing the circuit through the unit.

It is believed apparent that I have disclosed a method of heating which comprises positioning the heat generating means at the center of a cooking utensil, and causing the heat generated thereby to be transmitted by conduction and radiation laterally outwardly through the utensil, and consequently through the material to be cooked, to the lateral side walls of the utensil. In addition, I have provided means for adjusting the position of the heating unit, which adjustment will vary the amount of heat transmitted thereby to the utensil, and I have also provided for automatically controlling the energization of the unit in accordance with its position.

I do not intend to be limited to the exact details of construction which I have shown and described in connection with a preferred embodiment of the invention, but only insofar as limited by the scope and spirit of the appended claims.

I claim:

1. In a domestic electric range having a horizontal range surface, a plurality of helically wound vertically extending heat generating units, energizing means therefor including a pair of spaced contacts, and means at the front of said range for adjusting said units vertically with respect to the range surface including a rotatable contact bridging member movable into bridging engagement between said contacts in predetermined adjusted positions of said units.

2. In a domestic electric range, a range top comprising a heat refractory slab, a plurality of spaced sleeves depending therefrom, vertically adjustable carriers mounted in said sleeves, cone-shaped heating units supported on the upper ends of said carriers, and means at the front of said range for moving said carriers to adjust said units vertically above said slab.

3. In combination, an electric range including an electric heating element movable vertically with respect to the utensil-receiving surface of said range, a cooking utensil for use with said range having a bottom wall and a lateral defining side wall, and an inverted transparent heat resisting dome in said bottom wall disposed substantially centrally of said utensil and opening outwardly of the bottom of said utensil, said dome being adapted to receive said heating element.

4. In combination, a utensil having a bottom wall, a dome rising from said bottom wall and into the interior of the utensil, said dome being disposed substantially centrally within the utensil at a position of maximum diameter of the utensil and formed of a material through which both radiant and conducted heat are adapted to be transmitted to the contents of the vessel, and a heating element extending from beneath the bottom of the utensil and up into said dome to substantially the upper end thereof for delivering radiant and conducted heat through said dome to the contents of the utensil.

5. In combination, a utensil of generally elliptical form and having a bottom wall, a pair of dome members integral with the bottom wall and rising up into the interior of the utensil and disposed at the focal centers of the utensil and at substantially the maximum diameter of the utensil, and heating elements extending from beneath the bottom of the utensil and up into said domes to substantially the upper ends thereof.

6. In combination, a range having a refractory plate, a utensil having a bottom portion adapted to rest upon said plate, a dome rising from the bottom portion of said utensil and into the interior of the utensil and opening downwardly to receive a heating unit, a heating unit rising from beneath the bottom of the utensil and into said dome and comprising an upwardly elongated heat insulating member having a resistance coil wound helically thereon, means for adjusting the extension of said heating unit above the top of said refractory plate a substantial amount, and a circuit for said heating unit closed when said unit is in fully raised position and through a substantial range of adjustment of said unit.

7. In combination, a range, an electric heating unit rising up above the top of said range and comprising an upwardly elongated heat insulating member having a resistance coil wound helically thereon, means for adjusting the extension of said heating unit above the top of said range a substantial amount, and an electric circuit for said heating unit closed when said heating unit is in fully raised position and through a substantial range of adjustment of said unit.

8. In combination, a range having a refractory plate, a sleeve member opening through said plate and depending therefrom, a carrier guided in said sleeve member, an electric heating unit supported by said carrier and rising above the top of said plate, a rack on said carrier, a pinion meshing with said rack for adjusting said carrier and heating unit vertically, a contact operable with said pinion and having an insulating portion, and contacts bearing against and connected by said first contact in certain positions of said heating unit, one of said last contacts bearing against the insulating portion of said first contact to open the circuit for the heating unit in another position of said unit.

9. In a domestic electric range having a horizontal range surface, a helically wound vertically extending heat generating unit, energizing means therefor including a pair of spaced contacts, and means at the front of said range for adjusting said unit vertically with respect to the range surface including a rotatable contact bridging member movable into bridging engagement between said contacts in predetermined adjusted positions of said unit.

10. A cooking utensil of the class described having a metal bottom wall provided with an opening therein, a lateral defining metal side wall, and an inverted transparent heat resisting dome secured to said bottom wall and closing the opening therein, said inverted transparent heat resisting dome extending upwardly over said opening into the interior of the utensil within said lateral defining side wall and opening outwardly of the bottom of the utensil.

11. A cooking utensil of the class described having a metal bottom wall provided with an opening therein, a lateral defining metal side wall, and a transparent heat resisting member secured to said bottom wall and closing the opening therein, said transparent heat resisting member being adapted to transmit both radiant and conducted heat to the contents of the utensil when the utensil is disposed with said transparent heat resisting member adjacent a heater externally of the utensil, at least a portion of the transparent heat resisting member extending upwardly over the opening in the said bottom wall.

12. A metal cooking utensil having in the bottom wall thereof a dome formed of material capable of transmitting radiant energy into the contents of the utensil.

EDMUND O. SCHWEITZER.